UNITED STATES PATENT OFFICE.

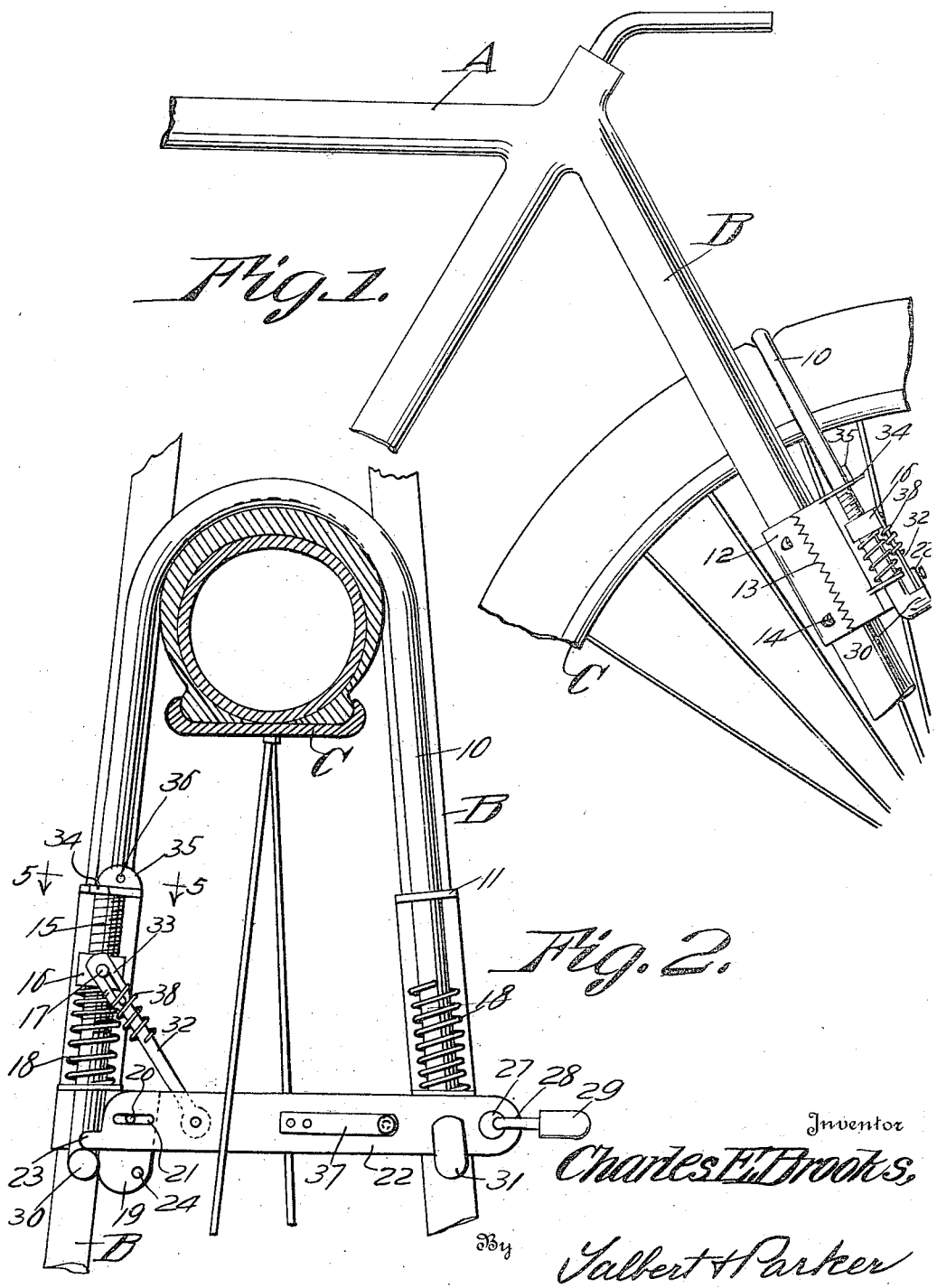

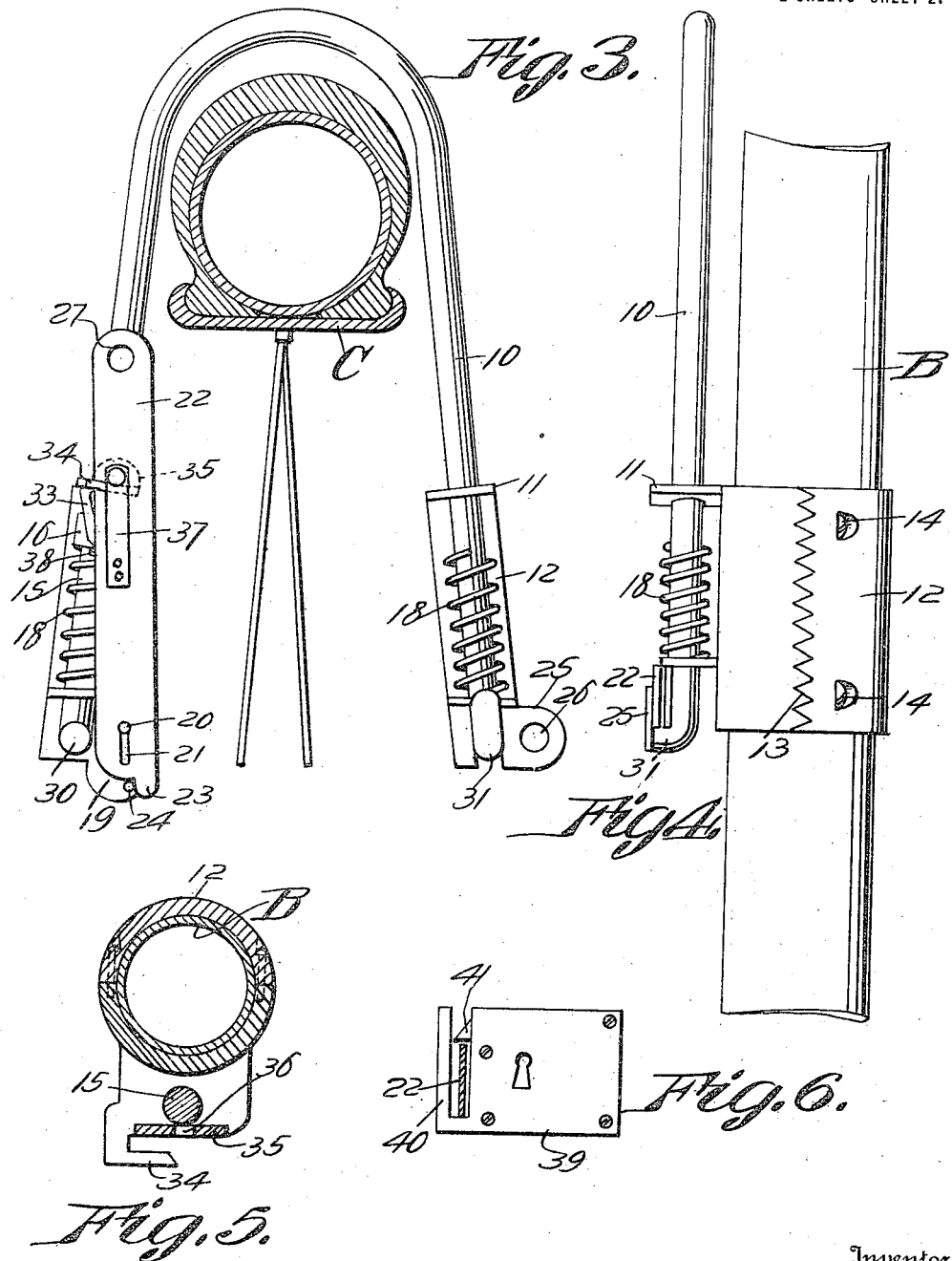

CHARLES E. BROOKS, OF CAMDEN, NEW JERSEY.

LOCK.

1,267,177. Specification of Letters Patent. Patented May 21, 1918.

Application filed May 2, 1917. Serial No. 166,018.

*To all whom it may concern:*

Be it known that I, CHARLES E. BROOKS, a citizen of the United States, residing at Camden, in the county of Camden and State of New Jersey, have invented certain useful Improvements in Locks, of which the following is a specification, reference being had therein to the accompanying drawing.

The invention relates to a lock, and more particularly to the class of motorcycle or bicycle locking devices.

The primary object of the invention is the provision of a locking device of this character wherein the same is fitted to the frame of the motorcycle or bicycle at the rear fork thereof so as to permit the locking of the rear wheel to prevent the rotation thereof thereby obviating the theft of the motorcycle or bicycle.

Another object of the invention is the provision of a locking device of this character wherein a brake member is operated to engage the tired rear wheel in addition to a locking bar which is positioned between the spokes of the wheel so as to avoid the possibility of the turning of the wheel by an unscrupulous person, the locking device being of novel construction to assure the secure locking of the rear wheel.

A further object of the invention is the provision of a locking device of this character wherein the brake is controlled by the locking bar so that on movement of the latter simultaneous movement will be imparted to the brake for the secure locking of the rear wheel of a motorcycle or bicycle.

A still further object of the invention is the provision of a lock of this character which is simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a fragmentary side elevation of a bicycle showing a lock constructed in accordance with the invention applied and in locked position;

Fig. 2 is an enlarged fragmentary vertical sectional view through the rear wheel of the bicycle, with the lock shown in locking position;

Fig. 3 is a view similar to Fig. 2, with the lock released;

Fig. 4 is a side elevation of the lock in locking position;

Fig. 5 is a sectional view on the line 5—5 of Fig. 2, looking in the direction of the arrows;

Fig. 6 is a detail elevation of a modified adjunct part of the lock in substitute for a pad-lock.

Similar reference characters indicate corresponding parts throughout the several views of the drawings.

Referring to the drawings in detail, A designates generally a portion of the main frame of a bicycle, although it may be a motorcycle frame or the like, and B the limbs of the rear fork thereof which are of the usual construction, and upon this rear fork is mounted the locking device hereinafter fully described.

The locking device comprises an inverted substantially U-shaped yoke 10 which is adapted to straddle the tire of the rear wheel C of the bicycle and has its limbs slidably fitted in guide ears 11 spaced from each other and projecting outwardly from split collars or sleeves 12, the meeting edges of the front of each collar or sleeve 12 being formed with interlocking teeth 13, and these meeting edges are detachably united to each other through the medium of screw members 14 fitted within the collars or sleeves 12 so that the latter can be detachably mounted upon the limbs B of the rear fork of the bicycle A for tightly embracing the said limbs thereof as is clearly shown in Figs. 1, 4 and 5 of the drawings.

The yoke 10 is adapted to be moved from normal raised position downwardly in the ears 11 for gripping the tire on the rear wheel C of the bicycle A for service as a brake thereon to prevent the rotation of the rear wheel.

Formed on one of the limbs of the yoke 10 are screw threads 15 with which adjustably engages a ring or collar 16 carrying a pivot pin 17 which also acts as a set screw for the ring or collar to lock the same in adjusted positions, while surrounding both limbs of the yoke are coiled expansion springs 18, the upper end of one spring being engaged with the collar or ring 16 while the upper end of the other spring is made fast to the opposite limb of the yoke 10 and the lower ends of these springs 18 rest against the lowermost ears 11, and said springs act to automactically raise the yoke 10 to normal position for disengaging the tire on the rear wheel C of the bicycle, thereby freeing the said wheel.

Formed beneath the lowermost ears 11 at the left hand side of the rear wheel C is a bearing 19 in which is fixed a guide pin 20, the same being engaged within an elongated slot 21 formed in a locking bar 22, which latter, by the employment of the pin 20, is pivotally and slidably connected to the bearing 19 so as to be swung into substantially horizontal position transversely of the rear fork of the bicycle A to engage between the spokes of the rear wheel C for the locking of said rear wheel. The locking bar 22 at its slotted end is formed with a nib 23 which is adapted to engage with an abutment pin or lug 24 on the bearing 19 when in raised unlocking position so as to hold the said bar 22 in said raised position, as is clearly shown in Fig. 3 of the drawing, and on the lifting of the bar 22 to bring the nib 23 out of engagement with the lug 24 it can be swung to locking position. On the lowermost ear 11 at the right hand side of the rear fork B is a keeper 25 which is formed with an opening 26, and this keeper coöperates with the locking bar 22 at the end opposite the slot 21, which end is provided with an opening 27 to register with the opening 26 for receiving the jaw 28 of a pad-lock 29, and in this manner the locking bar 22 is secured in its locking position, as shown in Fig. 2 of the drawing.

The yoke 10, at the extremities thereof, is formed with terminal hooks 30 and 31, respectively, with which engage the locking bar 22 to fasten the said yoke 10 in its lowered gripping position relative to the tired rear wheel C of the bicycle for acting as a brake thereon when the locking bar 22 is in locking position.

Pivoted to the locking bar 22 is a link 32 which is formed with an elongated slotted end 33 slidably engaging the pivot 17 on the collar 16, and on swinging the locking bar to raised position the yoke 10 is simultaneously raised out of engagement with the tire on the rear wheel C, and on the lowering of the locking bar to locking position the said yoke 10 is lowered therewith for serving as a brake on the rear wheel.

Formed on the uppermost ear 11 at the left hand side of the rear wheel C is a hook-like jaw 34 in which is adapted to engage the locking bar 22 when raised to inactive position and also on this ear 11, at the inner side of the jaw, 34, is an upstanding extension 35 having a hole 36 therein, while mounted on the locking bar 22 is a spring latch 37 which is adapted to engage in the hole 36 when the bar 22 is raised for fastening the latter in such position.

Fixed to the link 32 is one end of a coiled spring 38 which surrounds the link, and has its opposite end playing against the collar or ring 16, and this spring serves to move the locking bar 22 when the nib 23 is moved off of the terminal hook 30 into positive engagement with the lug 24 when the locking bar 22 is swung upwardly to the position shown in Fig. 3 of the drawings, thus preventing the accidental dropping of the locking bar 22 from normal unlocking position should the latch 37 disengage the extension 35.

It will be noted that when the locking bar 22 is moved to locking position the yoke 10 is simultaneously moved therewith to braking position for engagement with the conical tire on the rear wheel C of the bicycle A, and said locking bar 22 lies transversely between certain of the spokes of the rear wheel so that the latter is held against rotation, and this locking bar 22 is made secure through the use of the pad-lock 29 to prevent unscrupulous persons from operating the wheel lock for the theft of the bicycle or the riding of the same.

In Fig. 6 there is shown a slight modification, wherein a lock casing 39 is provided and is adapted to be fastened below the ear 11 at the right hand side of the rear wheel C in substitute for the keeper 25, and this lock casing is formed with a keeper extension 40 in which is received the locking bar 22 and the latch bolt 41 of the lock mechanism within the casing 39, which is controlled by a key, will make fast the locking bar 22 in the keeper 40 for the securing of said locking bar.

From the foregoing description, taken in connection with the accompanying drawings, the construction and operation of the herein described lock will be readily apparent and, therefore, a more extended explanation has been omitted.

Having thus described my invention, I claim:

1. A locking device of the character described comprising a braking yoke adapted to straddle the rear wheel of a bicycle or motorcycle for engagement therewith, supports for the said yoke, a locking bar pivoted to one of the supports and having connection with the yoke for simultaneously operating the same to bring the yoke in braking position relative to the wheel when the locking bar is swung transversely between the spokes of said wheel, and means for securing the locking bar in locking position.

2. A locking device of the character described comprising a braking yoke adapted to straddle the rear wheel of a bicycle or motorcycle for engagement therewith, supports for the said yoke, a locking bar pivoted to one of the supports and having connection with the yoke for simultaneously operating the same to bring the yoke in braking position relative to the wheel when the locking bar is swung transversely between the spokes of said wheel, means for securing the locking bar in locking position, and means acting upon the yoke to automatically raise the same on the swinging of the locking bar to released position.

3. A locking device of the character described comprising a braking yoke adapted to straddle the rear wheel of a bicycle or motorcycle for engagement therewith, supports for the said yoke, a locking bar pivoted to one of the supports and having connection with the yoke for simultaneously operating the same to bring the yoke in braking position relative to the wheel when the locking bar is swung transversely between the spokes of said wheel, means for securing the locking bar in locking position, means acting upon the yoke to automatically raise the same on the swinging of the locking bar to released position, and terminal hooks on the extremities of the yoke and engageable by the locking bar when in locking position.

4. A locking device of the character described comprising a braking yoke adapted to straddle the rear wheel of a bicycle or motorcycle for engagement therewith, supports for the said yoke, a locking bar pivoted to one of the supports and having connection with the yoke for simultaneously operating the same to bring the yoke in braking position relative to the wheel when the locking bar is swung transversely between the spokes of said wheel, means for securing the locking bar in locking position, means acting upon the yoke to automatically raise the same on the swinging of the locking bar to released position, terminal hooks on the extremities of the yoke and engageable by the locking bar when in locking position, and coöperative means on one of the supports and the locking bar for holding the latter in normal raised unlocking position.

5. A locking device of the character described comprising a braking yoke adapted to straddle a wheel, supporting means for the yoke, a locking member operably connected to the supporting means and the yoke and movable into a locking position between the spokes of the wheel so as to bring the yoke in braking position relative to the wheel, and means for securing the locking member in locking position to consequently hold the braking yoke in braking position.

In testimony whereof I affix my signature.

CHARLES E. BROOKS.

Copies of this patent may be obtained for five cents each, by addressing the "Commissioner of Patents, Washington, D. C."